United States Patent
Sugimoto et al.

(10) Patent No.: US 6,635,215 B2
(45) Date of Patent: Oct. 21, 2003

(54) PROCESS FOR PRODUCING SILICON CARBIDE COMPOSITES FROM SILICON-BASED POLYMERS BY RADIATION APPLICATION

(75) Inventors: Masaki Sugimoto, Gunma (JP); Yosuke Morita, Gunma (JP); Kiyohito Okamura, Osaka (JP); Masayoshi Itoh, Fukushima (JP)

(73) Assignee: Japan Atomic Energy Research Institute, Tokyo (JP)

( * ) Notice: Subject to any disclaimer, the term of this patent is extended or adjusted under 35 U.S.C. 154(b) by 0 days.

(21) Appl. No.: 09/955,132

(22) Filed: Sep. 19, 2001

(65) Prior Publication Data

US 2002/0056946 A1 May 16, 2002

(30) Foreign Application Priority Data

Sep. 19, 2000 (JP) .................................... 2000/283302

(51) Int. Cl.[7] .............................................. H05B 6/00
(52) U.S. Cl. ....................................... 264/430; 264/434
(58) Field of Search ................................ 264/430, 434

(56) References Cited

U.S. PATENT DOCUMENTS 5,171,722 A * 12/1992 Toreki et al. .................. 501/88
5,571,848 A * 11/1996 Mortensen et al. ............ 521/61
6,217,997 B1 * 4/2001 Suyama et al. ........... 428/293.4

FOREIGN PATENT DOCUMENTS

JP             411130552        * 5/1999

OTHER PUBLICATIONS

"Processing of Ceramic Matrix Composites," R. R. Naslain, Key Engineering Materials vols. 164–165 (1999) pp. 3–8.
"Fine Ceramic Fibers," Anthony R. Bunsell, Marie–Hélène Berger and Anthony Kelly, Marcel Dekker, Inc., New York, Basel, 1999, pp. 1–64.

* cited by examiner

Primary Examiner—Christopher A. Fiorilla
(74) Attorney, Agent, or Firm—Banner & Witcoff, Ltd.

(57) ABSTRACT

Polycarbosilane is mixed with 5–35 wt % of polyvinylsilane to prepare a silicon-base polymer blend which is impregnated in silicon carbide fibers or fabrics to form a preceramic molding body which is exposed to an ionizing radiation to be rendered curing and then fired in an inert gas to produce a composite in which the silicon carbide matrix is reinforced with the silicon carbide fibers.

2 Claims, 1 Drawing Sheet

PROCESS FOR PRODUCING SILICON CARBIDE COMPOSITES FROM SILICON-BASED POLYMERS BY RADIATION APPLICATION

This application is based upon and claims the benefit of priority from Japanese Patent Application No. 2000-283302, filed Sep. 19, 2000, the entire contents of this application are incorporated herein by reference.

BACKGROUND OF THE INVENTION

This invention relates to a process for producing silicon carbide fiber reinforced, silicon carbide matrix composites by polymer impregnation and subsequent radiation application. The produced silicon fiber reinforced, silicon carbide matrix composites have high strength and high heat resistance and exhibit a nonbrittle fracture behavior.

Silicon carbide is a heat-resistant and high-strength material and has been commercially available in fiber form and in fabrics such as textiles woven from the fibers. However, on account of its low resistance to mechanical and thermal shocks, the commercial application of silicon carbide has not yet expanded to non-fiber shapes such as the materials of construction of turbine blades and internal-combustion engines. In an experiment conducted by the present inventors, turbine blade samples made of a crystalline silicon carbide shape were subjected to a continuous high-speed rotation test and found to break in about several hundred hours; in addition, the fragments of the broken turbines flew about at high speed to potentially damage the surrounding objects.

To correct this drawback of silicon carbide, its matrix is reinforced with silicon carbide fibers to make a silicon carbide fiber reinforced, silicon carbide matrix composite (hereunder referred to as "silicon carbide composite"). Intensive R&D efforts are being made for the silicon carbide composite as a material that maintains the characteristics of the silicon carbide matrix such as high heat resistance and high strength while exhibiting a nonbrittle fracture behavior and which can be processed into larger ceramic shapes.

Three methods are currently used to produce silicon carbide composites, 1) chemical vapor infiltration, 2) molten silicon impregnation, and 3) multiple polymer impregnation (see "Processing of Ceramic Matrix Composites", R. R. Naslain, Key Engineering Materials Vols. 164–165 (1999) pp. 3–8).

In chemical vapor infiltration, silicon carbide in fiber or fabric form is preliminarily shaped and subjected to gas-phase reaction between silane gas and a hydrocarbon compound gas to form a matrix between fibers, thereby producing a silicon carbide composite. In this method, the silicon carbide matrix is formed on the surfaces of the reinforcing fibers and between themselves by the high-temperature reaction of the feed gases being borne by a carrier gas, so an unduly long time is required to produce the composite; in addition, a complicated apparatus is necessary and difficulty is involved not only in forming the matrix uniformly throughout the shape but also in producing large composites.

In molten silicon impregnation, carbon particles are filled between silicon carbide fibers which are then immersed in a molten silicon bath so that carbon reacts with silicon to form a silicon carbide composite. The main problem with this method is that carbon and silicon do not undergo stoichiometric reaction but remain unreacted here and there in the matrix, causing defects such as reduced resistance to oxidation and lower strength at elevated temperatures.

In multiple polymer impregnation, silicon carbide fibers are impregnated with a precursor polymer (e.g. polycarbosilane) which becomes a matrix by firing and the precursor polymer is then fired to a ceramic state, thereby forming a silicon carbide composite. This method can produce the ceramic composite more easily than chemical vapor infiltration and it has many other advantages such as the ability to form a uniform microfine structure in the matrix and suppress fracture due, for example, to stress concentration. On the other hand, the silicon-based polymer shrinks as it turns to an inorganic ceramic state upon firing and its volume decreases to about one half the volume of the initial polymer. To deal with this problem, the impregnation and firing cycles must be repeated 7 to 10 times in the usual process of producing the silicon carbide composite by polymer impregnation. Another problem with the multiple polymer impregnation concerns the pyrolysis that is performed in an oxidizing atmosphere to make the silicon-based polymer infusible (through oxygen-mediated crosslinking of polymer molecules) and the oxygen that is eventually incorporated into the silicon carbide composite contributes to a marked drop in its heat resistance.

Each of the three methods for producing silicon carbide composites has the need to treat the surfaces of the reinforcing silicon carbide fibers with boron nitride or carbon. Otherwise, the produced silicon carbide composites undergo brittle fracture (see "Processing of Ceramic Matrix Composites", supra, and "Fine Ceramic Fibers", Anthony R. Bunsell, Marie-Hélène Berger and Anthony Kelly, pp. 1–62 in Fine Ceramic Fibers, edited by Anthony R. Bunsell and Marie-Hélène Berger, Marcel Dekker, Inc., New York, Basel, 1999). This is because the silicon carbide matrix formed by firing binds directly with the silicon carbide fibers and the resulting integral structure breaks under impact (brittle fracture occurs). Then there is no sense in forming the composite by a complex procedure. On the other hand, the treatment with boron nitride intended to prevent brittle fracture is applied to the entire surfaces of the silicon carbide fibers by a chemical gas-phase route and is a very time-consuming and costly process.

The silicon carbide composite also has the potential to be used as the material of construction of the inner walls of nuclear fusion reactors. Since carbon and silicon emit only short-lived radioactive substances upon irradiation with neutrons, the silicon carbide composite is a promising heat-resistant material that emits low radio-activity. To realize this expectation, the concentrations of impurities must be lowered and, in particular, the contents of nitrogen and metallic elements have to be made considerably lower than the heretofore tolerable levels. However, contamination by nitrogen and metallic atoms has been unavoidable in the multiple polymer impregnation and molten silicon impregnation processes.

As described above, no method has been established to date that is capable of producing silicon carbide composites that have high heat resistance, high strength and high purity while exhibiting a nonbrittle fracture behavior.

SUMMARY OF THE INVENTION

An object, therefore, of the present invention is to provide a process by which silicon carbide composites that have high strength, high heat resistance and high purity while exhibiting a nonbrittle fracture behavior can conveniently be produced by blending polycarbosilane and polyvinylsilane as two silicon-based polymers in a specified ratio, impregnating the resulting polymer blend in silicon carbide fibers to prepare a preceramic molding body, exposing the preceramic molding body to radiation and firing the irradiated preceramic molding body.

DETAILED DESCRIPTION OF THE INVENTION

Figure 1:
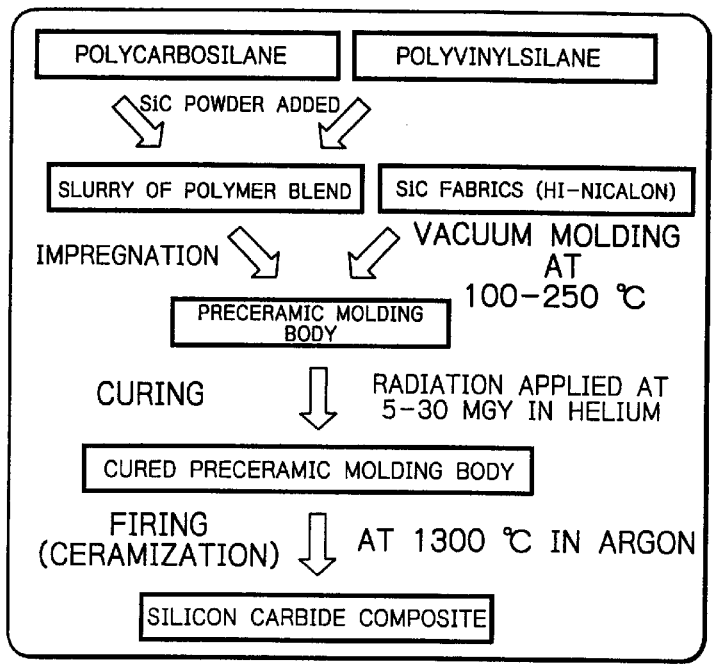
FIG. 1 is a schematic representation of steps in the process of the invention for producing ceramic composites.

To produce the silicon carbide composite by the polymer impregnation approach, it is extremely important to prepare a dense preceramic shape from the reinforcing silicon carbide fibers or fabrics and the silicon-based polymer which becomes a matrix upon firing. The present invention meets this need by using a precursor polymer which is a silicon-based polymer characterized in that polycarbosilane is mixed with 5–35 wt % of polyvinylsilane (said polymer is hereunder referred to as a "Si-based polymer blend").

For polymer impregnation of the reinforcing silicon carbide fibers or fabrics, the Si-based polymer blend is dissolved in a suitable solvent such as benzene, toluene or cyclohexane, the fibers are fully immersed in the resulting solution, the solvent is distilled off under reduced pressure and the residue is pressed under reduced pressure and at elevated temperature to form a polymer/fiber preceramic molding body.

To prepare a dense molding body, it is effective to melt the matrix under reduced pressure and remove the micro pores together with the solvent. However, if the silicon carbide fibers are impregnated with polycarbosilane alone and if the matrix is heated to a temperature equal to or higher than the melting point of polycarbosilane and held in a vacuum atmosphere, polycarbosilane evaporates making it difficult to prepare a dense shape.

If the Si-based polymer blend is used in accordance with the invention, the polyvinylsilane contained in it effectively suppresses the volatilization of polycarbosilane and the melt can be easily molded in vacuum under a hot press into a dense fiber/polymer preceramic molding body having a limited number of voids.

Polycarbosilane is a high-molecular weight compound having the Si—C main chain that is produced by modifying permethylpolysilane; it is a solid and a melting point is 233° C. Polyvinylsilane is a high-molecular weight compound produced by radical, anionic or coordination anionic polymerizatin of vinylsilane ($CH_2=CH—SiH_3$); it is a highly viscous liquid at room temperature (see "Macromolecules", 31, 5609 (1998)).

By blending polycarbosilane with polyvinylsilane, the softening and melting points of the Si-based polymer blend can be lowered by at least 100° C. and its viscosity in the temperature range of 100–250° C. can be sufficiently lowered to make it more fluid. As a result, the highly fluid Si-based polymer blend will also get into the spaces between fine fibers to form a dense preceramic molding body.

The intended effect of polyvinylsilane is not fully achieved if its content in the Si-based polymer blend is less than 5 wt %. Further, due to the high melting temperature, polycarbosialne will volatilize under reduced pressure, making it impossible to produce a dense preceramic shape having only a small number of voids. If the polyvinylsilane content is more than 35 wt %, the Si-based polymer blend is so soft at room temperature that it is difficult to retain the morphology of the preceramic shape.

Fine silicon carbide and fine silicon nitride powders can be incorporated in the Si-based polymer blend, preferably in amounts of 100–500 wt % of the latter. The Si-based polymer blend will shrink in volume when it is fired to become a silicon carbide ceramic. To deal with this problem, a fine silicon carbide or fine silicon nitride powder comprising particles as fine as several micrometers is incorporated in the Si-based polymer blend so that the matrix will not shrink excessively during firing. The fine silicon carbide and fine silicon nitride powders are not very effective against shrinkage during firing if their content in the Si-based polymer blend is less than 100 wt %. If their content is greater than 500 wt %, the Si-based polymer blend is no longer fluid and cannot be sufficiently impregnated in the fibers or fabrics to retain the morphology of the preceramic shape.

The thus prepared preceramic molding body is cured by radiation irradiation such as γ-rays, x-rays and high-energy electrons. The cured preceramic molding body is then fired in an inert gas to produce a silicon carbide composite that shows a nonbrittle fracture behavior. Irradiation to radiation is an essential treatment to ensure that high-purity ceramics are obtained by firing since upon irradiation, the Si-based polymer blend is crosslinked and protected against deformation and polymer dissolution during pyrolysis. If electrons are to be used as a radiation source, their energy determines the flight through the preceramic molding body, so their penetration energy is desirably chosen in consideration of the thickness of the preceramic shape.

To produce the silicon carbide composite, the Si-based polymer blend need be crosslinked to such an extent that the preceramic molding body can retain its shape during pyrolysis that occurs in the firing step. To meet this need, the Si-based polymer blend should desirably be exposed to doses of 5–30 MGy. Curing by irradiation offers a great benefit in equipment design and manufacturing process since there is no need to use a mold in firing the cured preceramic molding body. If no radiation curing is adopted, the impregnation and firing cycles must be repeated about eight to ten times in order to make the composite. In the process of the invention, the impregnation, irradiation and firing cycles need be repeated no more than twice in order to produce a high-density silicon carbide composite.

After the step of irradiation, the preceramic shape is desirably heated up to about 500° C. in an inert gas so that the radicals (unpaired electrons) generated upon irradiation are quenched. If the preceramic molding body rendered curing by irradiation in an inert gas is immediately subjected to radical quenching without being transferred into air atmosphere, the incorporation of oxygen and impurities into the silicon carbide composite can be reduced. The preceramic molding body is subsequently fired at 1000–1500° C., optionally under pressure, to produce the silicon carbide composite. The thus produced silicon carbide composite has much higher purity than the conventional product due to extremely reduced impurity levels. If the preceramic molding body cured by thermal oxidation rather than irradiation, the produced silicon carbide composite contains oxygen which is quite deleterious to heat resistance. The upper limit of the heat resistance of composites that are produced by a process involving the step of rendering the preceramic molding body cured by thermal oxidation is 1300° C. whereas the process of the invention can produce high-purity ceramic composites that withstand temperatures as high as 1600–1700° C.

Generally speaking, the silicon carbide composite has plasticity, strength and modulus as it contains more of the reinforcing fibers. The present invention provides a process for producing a silicon carbide composite containing the silicon carbide fibers or fabrics in an amount of 30–70% by volume. The content of the silicon carbide fibers or fabrics is expressed by volume percentage since the silicon carbide fibers have a different density than the silicon carbide matrix formed by firing.

The theoretical maximum value for the volume fraction of the fiber reinforcement in the composite varies with the method of weaving the fibers. If the fibers are arranged in only one direction, they can be contained in a volume up to about 70% but if they are plain woven into a 2D fabric, their maximum volume is about 55%. If the matrix polymer is solely composed of polycarbosilane, the fluidity of a polymer slurry containing the fine ceramic powder is so low that it is extremely difficult to have the fibers contained in a theoretically maximum volume and, in the case of plain weaving the reinforcing fibers, the resulting composite can have no more than 30 vol % of the fibers. In contrast, the Si-based polymer blend has sufficiently low viscosity that a plain woven fabric of the reinforcing fibers need be impregnated with the Si-based polymer blend only once to produce composites having a fiber volume fraction of 30–55%.

The reason why silicon carbide composites exhibiting a nonbrittle fracture behavior can be obtained by using the Si-based polymer blend may be speculated as follows. Polyvinylsilane is a highly viscous liquid at room temperature; if silicon carbide fibers or fabrics are immersed in a solution of the Si-based polymer blend in a solvent and sonicated, the preceramic molding body is formed with polyvinylsilane rather than polycarbosilane being selectively adsorbed on the surfaces of the silicon carbide fibers. When this preceramic molding body is fired, polyvinylsilane gives a more carbon enriched silicon carbide ceramic and, as a matter of fact, the result is just like what has been obtained by performing a surface treatment on the silicon carbide fibers as described in connection with the prior art. Therefore, from the characteristics viewpoint, the polymer mixture of polycarbosilane and polyvinylsilane is desirably used as the precursor polymer in the production of the silicon carbide composite.

The silicon carbide fibers or fabrics may be replaced by silicon nitride or zirconia in fiber or fabric form. Therefore, the present invention also provides a process for producing a ceramic fiber/silicon carbide matrix composite that exhibits a nonbrittle fracture behavior, and according to this process, silicon nitride fibers or fabrics or zirconia fibers or fabrics are impregnated with a precursor polymer comprising a mixture of polycarbosilane with 5–35 wt % of polyvinylsilane and the resulting preceramic shape is rendered cured by radiation and then fired in an inert gas.

FIG. 1 shows an example of the process flow for producing a silicon carbide composite according to the invention. In the first step, polycarbosilane is mixed with 5–35 wt % of polyvinylsilane and dissolved in an organic solvent such as benzene, toluene or cyclohexane to form a solution of Si-based polymer blend.

If desired, a fine silicon carbide (SiC) powder may be dispersed in the Si-based polymer blend in an amount of 100–500 wt % to prepare a polymer blend slurry. Before polymer impregnation, its solution or slurry may advantageously be degasified by sonication or freeze/thaw cycles; this is effective to remove gases from within the polymer solution or slurry, mix the polymers uniformly, and disperse the fine SiC crystal powder uniformly.

Fabrics of the silicon carbide fibers are immersed in the thus prepared polymer solution or slurry and sonication is performed to ensure that the Si-based polymer blend fully permeates the spaces between fibers. Thereafter, the solvent is gradually removed and after evacuation with a vacuum pump, hot pressing is effected at a temperature between 100 and 250° C. that is selected in accordance with the polyvinylsilane content, whereby a dense preceramic shape is prepared.

The preceramic shape is rendered infusible by irradiation with a dose of 5–30 MGy under the flow of a highly heat-conductive helium gas (or an inert gas such as argon). The irradiated preceramic molding body is then heated up to about 500° C. in an inert gas so as to quench the radicals (unpaired electrons) that have been generated upon irradiation. Thereafter, the cured preceramic molding body is transferred into a firing furnace and subjected to pyrolysis at 1100–1500° C. for one hour in an inert gas, whereby the Si-based polymer blend is converted to a ceramics state, producing a silicon carbide composite.

Since the preceramic molding body has been rendered cured, its morphology need not be protected with a mold or the like during firing the silicon carbide composite and yet there is no chance of the occurrence of deformation due to polymer dissolution. Of course, a much denser silicon carbide composite can be produced by firing the preceramic molding body under applied pressure.

The following examples are provided for the purpose of further illustrating the present invention but are in no way to be taken as limiting.

EXAMPLE 1

Samples of Si-based polymer blend were prepared from polycarbosilane (PCS; product of Nippon Carbon Co., Ltd.; Mn=2000) and polyvinylsilane (PVS; product of Mitsui Chemicals, Inc.; Mn=1000). Their melt viscosities were measured with a single cylinder-type viscometer (RB-80R, VISCO BLOCK VTB-360S of Tohki Sangyo). The viscometer was such that the cylinder was rotated in a liquid and the resistance created in the cylinder was measured to determine viscosity. The temperature-dependent volatilization of the samples was investigated at reduced pressures in the range of 0.1–10 Torr.

Table 1 shows the temperature at which the Si-based polymer blend had a viscosity of 5 Pa·s. A polymer viscosity of 5 Pa·s is a measure for fluidity since Si-based polymers are usually spun at that value or below. Adding PVS to PCS results in lowering the temperature at which the Si-based polymer blend has a viscosity of 5 Pa·s. When PCS was mixed with 20 wt % of PVS, the polymer blend started to melt at 120–130° C. and its viscosity dropped sharply at about 180° C. Compared to the case where only PCS was used, the temperature for 5 Pa·s decreased as much as about 100° C. The Si-based polymer blend hardly experienced polymer volatilization even when it was placed under vacuum at 250° C. On the other hand, PCS volatilized under vacuum at 320° C.

These data show that the Si-based polymer blend is effective not only in enhancing the efficiency of polymer impregnation in fibers or fabrics but also in achieving significant suppression of polymer volatilization during molding in vacuum at elevated temperatures.

TABLE 1

Polycarbosilane Content, Viscosity of Si-Based Polymer Blend and Its Volatilization

| | PVS content (wt %) in polymer blend | Temperature (° C.) at which polymer's viscosity was 5 Pa · s | Temperature drop per wt % of PVS (° C./wt %) | Temperature-dependent state* of polymer blend |
|---|---|---|---|---|
| Comparative Example 1 | 0 | 319 | — | Volatilized at 320° C. |
| Example 1 | 5 | 292 | 5.4 | Volatilized to some extent at 300° C. |
| do. | 10 | 258 | 6.8 | Not volatilized at 260° C. |
| do. | 20 | 226 | 3.2 | Not volatilized at 250° C. |
| do. | 30 | 173 | 5.3 | Not volatilized at 200° C. |
| do. | 35 | 165 | 1.6 | Somewhat sticky at room temperature |
| do. | 40 | 150 | 3.0 | Very sticky at room temperature |

*To check for volatilization, each sample was heated to selected temperatures in Ar gas and placed under vacuum (0.1–10 Torr) as it was held at that temperature.

EXAMPLE 2

Polycarbosilane (the same as in Example 1) was mixed with 20 wt % of polyvinylsilane (the same as in Example 1). To the polymer blend, a fine silicon carbide (SiC) powder (product of IBIDEN CO., LTD.; average particle size=0.27 μm) was added in an amount of 400 wt %. The mixture was dissolved in benzene to prepare a polymer blend slurry which was then fully agitated and degasified by sonication. A laminate of ten SiC fabrics (woven fabrics of Hi-Nicalon fibers; product of Nippon Carbon Co., Ltd.) was immersed in the slurry and sonicated so that the Si-based polymer blend fully permeated the spaces between fibers. The impregnated Si-based polymer blend was set on a hot press and molded at about 200° C. at a reduced pressure of 10 kg/cm² to make a preceramic molding body.

The preceramic molding body was put into an electron-beam (EB) irradiation chamber having a 50-μm thick Ti beem window and exposed to 15 MGy of 2 MeV EB at a dose rate of 2 kGy/sec under a helium flow at 1 L/min. The irradiated, now cured preceramic molding body was heated to about 500° C. in argon gas so as to quench the radicals generated upon EB exposure. The preceramic molding body was then transferred into a firing furnace, where it was heated up to 1300° C. in argon gas and fired to produce a silicon carbide composite. The composite was 2.2 mm thick and the volume fraction of the silicon carbide fibers in the composite was 45 vol %.

Figure 2:
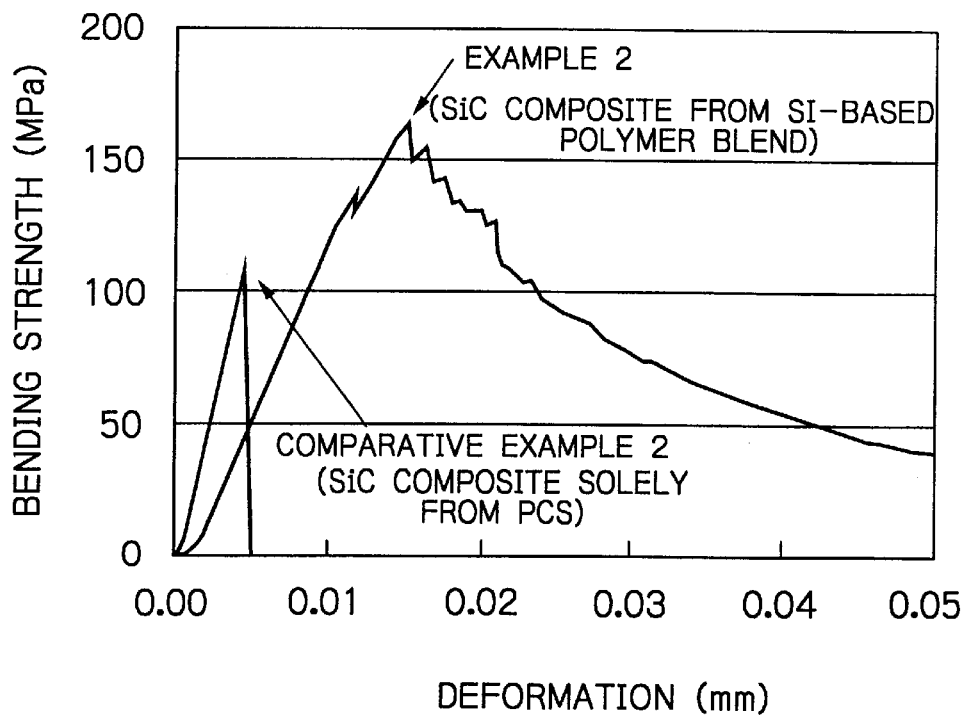
FIG. 2 is a graph showing the results of a three-point bending test on two silicon carbide composite samples.

The silicon carbide composite thus produced was subjected to a three-point bending test at a cross-head speed of 1 mm/min and a span length of 40 mm. The test sample was 10 mm wide and 2 mm thick. The test results are shown in FIG. 2. A silicon carbide composite having a density of 2.2 g/cm³ and a maximum bending strength of 150 MPa was obtained by a single cycle of impregnation, EB exposure and firing steps. The fibers in this silicon carbide composite were not subjected to any surface treatment but, as is clear from FIG. 2, the strength of the test sample changed gradually as it deformed in increasing amounts, thus retarding the progress of fracture. Even after the test, no complete rupture occurred in the test sample to cause delamination. In other words, the sample of silicon carbide composite prepared in Example 1 exhibited a nonbrittle fracture behavior and this indicates its ability to function as a ceramic composite.

Comparative Example 1

PCS (the same as in Example 1) was a white solid at room temperature and its viscosity dropped sharply at about 300° C. In order to ensure adequate fluidity, PCS must be heated to at least 319° C. (see Table 1). However, at such high temperatures, the PCS polymer decomposed thermally or volatilized and it was only with considerable difficulty that it could be impregnated between the silicon carbide fibers or fabrics.

Comparative Example 2

To PCS (the same as in Example 1), a fine silicon carbide (SiC) powder (the same as in Example 1) was added in an amount of 200 wt %. The mixture was dissolved in benzene to prepare a polymer slurry which was then fully agitated and degasified by sonication. A laminate of ten SiC fabrics (the same as in Example 2) was immersed in the slurry and sonicated so that the Si-based polymer blend fully permeated the spaces between fibers. The impregnated Si-based polymer blend was set on a hot press and molded at about 330° C. in argon gas at a reduced pressure of 10 kg/cm² to make a preceramic molding body.

The preceramic molding body was put into an electron-beam (EB) irradiation chamber having a 50-μm thick Ti incidence window and exposed to 15 MGy of 2 MeV EB at a dose rate of 2 kGy/sec under a helium flow at 1 L/min. The irradiated, now infusible preceramic shape was heated to about 500° C. in argon gas so as to quench the radicals generated upon EB exposure. The preceramic molding body was then transferred into a firing furnace, where it was heated up to 1300° C. in argon gas and fired to produce a silicon carbide composite. The composite was 2.3 mm thick and the volume fraction of the silicon carbide fibers in the composite was 28 vol %.

The silicon carbide composite thus produced by using only PCS as the precursor polymer was also subjected to a three-point bending test under the same conditions as in Example 2. The test results are also shown in FIG. 2. A silicon carbide composite having a density of 2.1 g/cm³ and a maximum bending strength of 100 MPa was obtained by a single cycle of impregnation, EB exposure and firing steps. The fibers in this silicon carbide composite were not subjected to any surface treatment and as is clear from FIG. 2, the strength of the test sample dropped abruptly after it peaked at little more than 100 MPa. In other words, the sample of silicon carbide composite prepared in Comparative Example 2 exhibited a brittle fracture behavior. After the testing, the fibers and the matrix in the test sample were found to have formed a relatively monolithic structure when they fractured; this was a typical state in which ceramics would break. Obviously, the sample prepared in Comparative Example 2 did not function as a ceramic composite.

In accordance with the present invention, the Si-based polymer blend consisting of polycarbosilane and polyvinylsilane is impregnated in the silicon carbide fibers and then made curing by exposure to radiation; as a result, silicon carbide composites of high fiber content can be produced by performing the cycle of impregnation, irradiation and firing steps no more than twice. In addition, the silicon carbide fibers need not be subjected to any special surface treatment and yet the composite is protected against brittle fracture.

Therefore, according to the invention, there is no need to use a mold during firing and this contributes to simplifying the production equipment and process. In addition, ceramic composites of complex shapes or large sizes can be produced by the process of the invention. If all of the impregnation, irradiation and firing steps are performed in an inert gas, one can produce ceramic composites having high heat resistance, high strength and high purity.

What is claimed is:

1. A process for producing a silicon carbide fiber reinforced, silicon carbide matrix composite having high strength and a high heat resistance of 1600–1700° C. and exhibiting a non-brittle fracture behavior used as the materials of construction of turbine blades or internal combustion engines, which comprises the steps of:

mixing polycarbosilane with 5–35 wt. % of polyvinylsilane to form a silicon-based polymer blend;

dissolving the polymer blend in a solvent of benzene, toluene, or cyclohexane to prepare a solution of a silicon-based polymer blend;

dispersing in the solution 100–500 wt. % of a silicon carbide or a silicon nitride powder based on the weight of the silicon-based polymer blend to prepare a polymer blend slurry;

degasifying the slurry by sonication or freeze/thaw cycles to remove gases from within the slurry;

impregnating the degasified slurry of the silicon-based polymer blend in silicon carbide fibers or fabrics by sonication to fully permeate the polymer blend in the spaces between the fibers or fabrics;

removing the solvent from the impregnated fibers or fabrics;

molding the impregnated fibers or fabrics under a hot press at a temperature of 100–250° C. in evacuation with a vacuum pump to form a dense preceramic molding body which has a limited number of voids and comprises 30–70 volume % of the silicon carbide fibers or fabrics;

applying radiation of a dose of 5–30 Mgy to the preceramic molding body in an inert gas to cross-link the silicon-based polymer blend which is impregnated in the preceramic molding body and to cure the preceramic molding body;

heating the resulting body to about 500° C. in an inert gas to quench the radicals (unpaired electrons) that have been generated upon irradiation; and firing the cured preceramic molding body in an inert gas at a temperature of 1,100–1,500° C. to form the silicon carbide fiber reinforced, silicon carbide matrix composite, wherein the polyvinlysilane suppresses the volatization of polycarbosilane when the cured preceramic molding body is fired under reduced pressure to a temperature equal to or higher than the melting point of polycarbosilane, and deformation of the cured preceramic molding body and polymer dissolution therefrom during firing is prevented by the cross-linked silicon-based polymer blend.

2. A process for producing a silicon nitride or zirconia fiber reinforced, silicon carbide matrix composite having high strength and a high heat resistance of 1600–1700° C. and exhibiting a non-brittle fracture behavior used as the materials of construction of turbine blades or internal combustion engines, which comprises the steps of:

mixing polycarbosilane with 5–35 wt. % of polyvinylsilane to form a silicon-based polymer blend;

dissolving the polymer blend in a solvent of benzene, toluene, or cyclohexane to prepare a solution of a silicon-based polymer blend;

dispersing in the solution 100–500 wt. % of a silicon carbide or a silicon nitride powder based on the weight of the silicon-based polymer blend to prepare a polymer blend slurry;

degasifying the slurry by sonication or freeze/thaw cycles to remove gases from within the slurry;

impregnating the degasified slurry of the silicon-based polymer blend in silicon nitride or zirconia fibers or fabrics by sonication to fully permeate the polymer blend in the spaces between the fibers or fabrics;

removing the solvent from the impregnated fibers or fabrics;

molding the impregnated fibers or fabrics under a hot press at a temperature of 100–250° C. in evacuation with a vacuum pump to form a dense preceramic molding body which has a limited number of voids and comprises 30–70 volume % of the silicon nitride or zirconia fibers or fabrics;

applying radiation of a dose of 5–30 Mgy to the preceramic molding body in an inert gas to cross-link the silicon-based polymer blend which is impregnated in the preceramic molding body and to cure the preceramic molding body;

heating the resulting body to about 500° C. in an inert gas to quench the radicals (unpaired electrons) that have been generated upon irradiation; and firing the cured preceramic molding body in an inert gas at a temperature of 1,100–1,500° C. to form the silicon nitride or zirconia fiber reinforced, silicon carbide matrix composite, wherein the polyvinlysilane suppresses the volatization of polycarbosilane when the cured preceramic molding body is fired under reduced pressure to a temperature equal to or higher than the melting point of polycarbosilane, and deformation of the cured preceramic molding body and polymer dissolution therefrom during firing is prevented by the cross-linked silicon-based polymer blend.

* * * * *